March 3, 1931. A. C. DAY 1,795,012
MACHINE FOR FEEDING TACKY GLUTINOUS MATERIAL
Filed Aug. 11, 1928 5 Sheets—Sheet 5

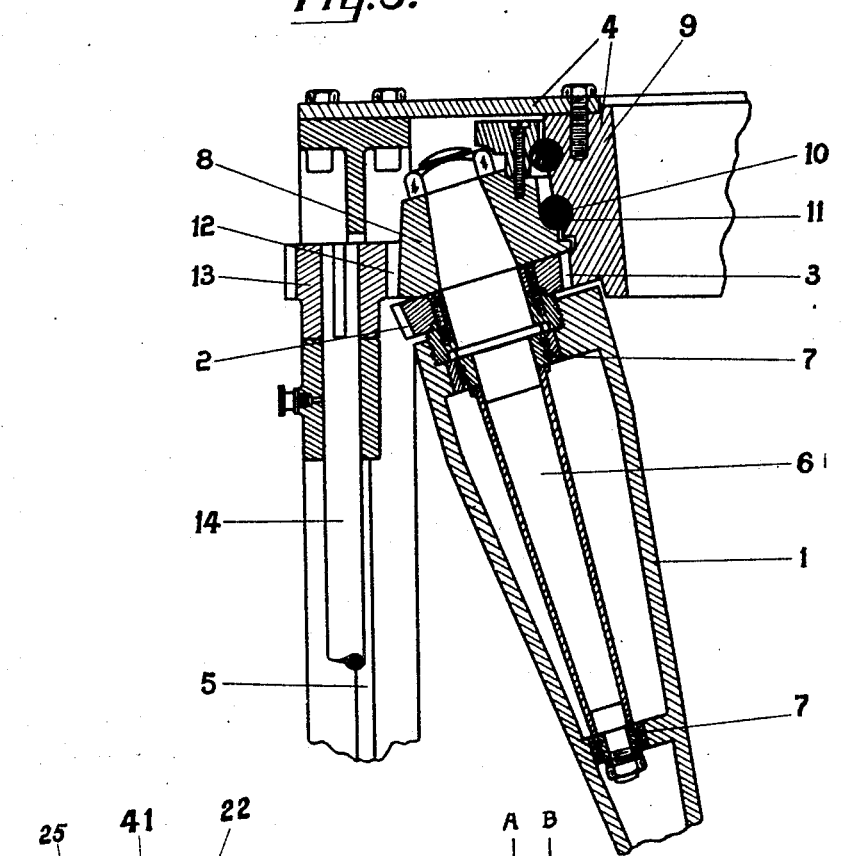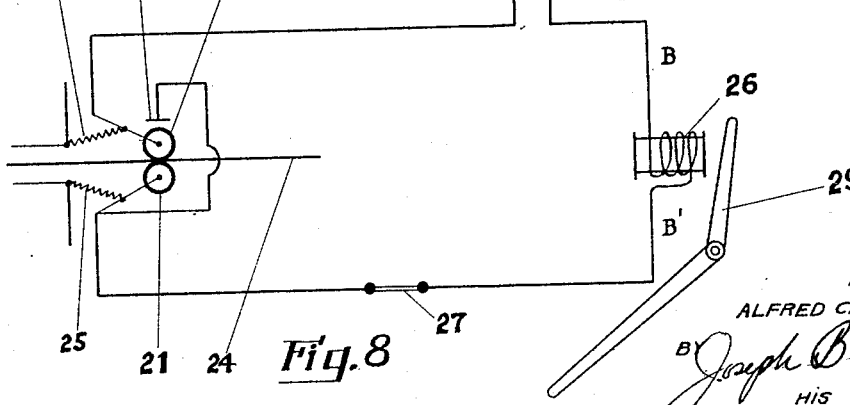

INVENTOR.
ALFRED CARLYLE DAY
BY Joseph B. Gardner
HIS ATTORNEY.

Patented Mar. 3, 1931

1,795,012

UNITED STATES PATENT OFFICE

ALFRED CARLYLE DAY, OF MELBOURNE, AUSTRALIA, ASSIGNOR TO G. & D. MANUFACTURING COMPANY PROPRIETARY LIMITED, OF MELBOURNE, AUSTRALIA, A CORPORATION OF VICTORIA

MACHINE FOR FEEDING TACKY GLUTINOUS MATERIAL

Application filed August 11, 1928, Serial No. 298,910, and in Australia March 14, 1928.

My invention relates to a machine for feeding tacky glutinous material and especially confectionery stock of that nature; and the objects of my invention are, first, to provide a machine for working tacky tenacious batches of material into ropes, rods or bars and, second, to feed this rope-like product forward, without any handling by operatives during the process, and, third, to prevent contamination of the material by oil and like foreign matter, and, fourth, to throw the machine out of operation when associated machinery, which is fed therefrom, ceases to function, thus reducing the amount of attention necessary.

I attain these objects by the mechanism illustrated in the accompanying drawing, in which—

Figure 3 is an enlarged section illustrating the mounting of a roller.

Figure 8 is a diagram of a tripping circuit.

Figure 1:
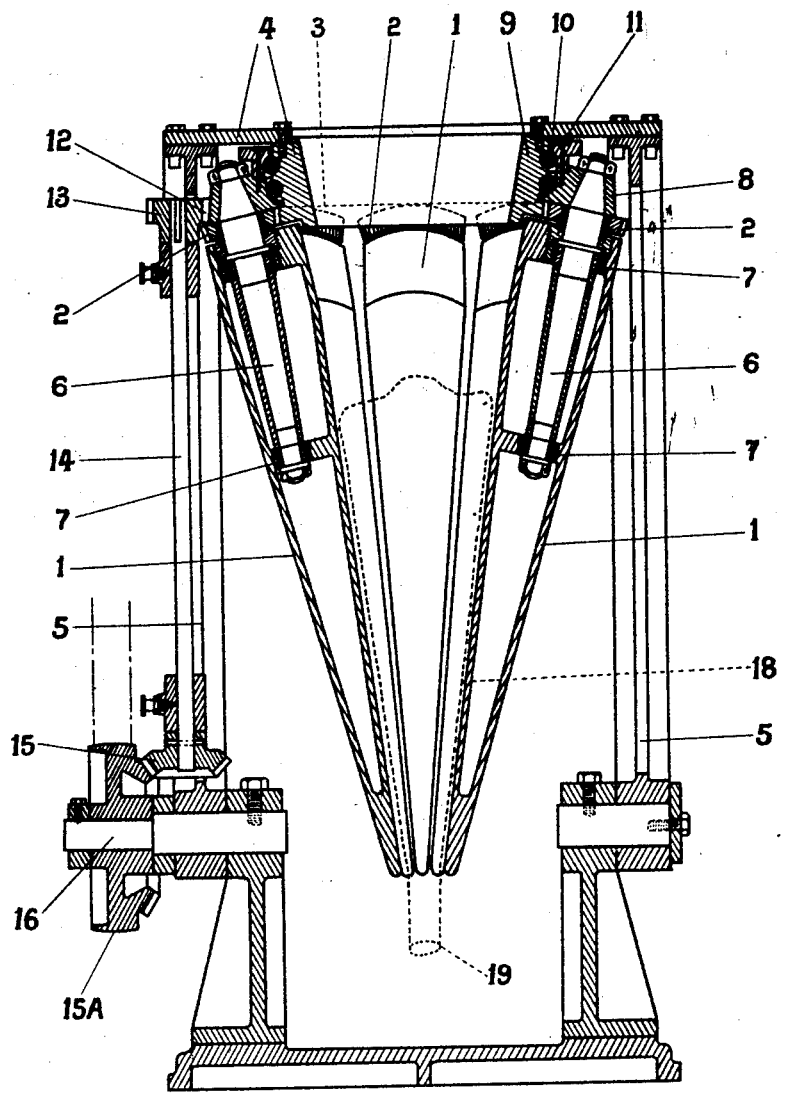
Figure 1 is a sectional front elevation of the machine showing in vertical section the kneading rollers which work the material, portion of the frame adjustment and releasing means being omitted for the sake of simplicity.
Figure 2:
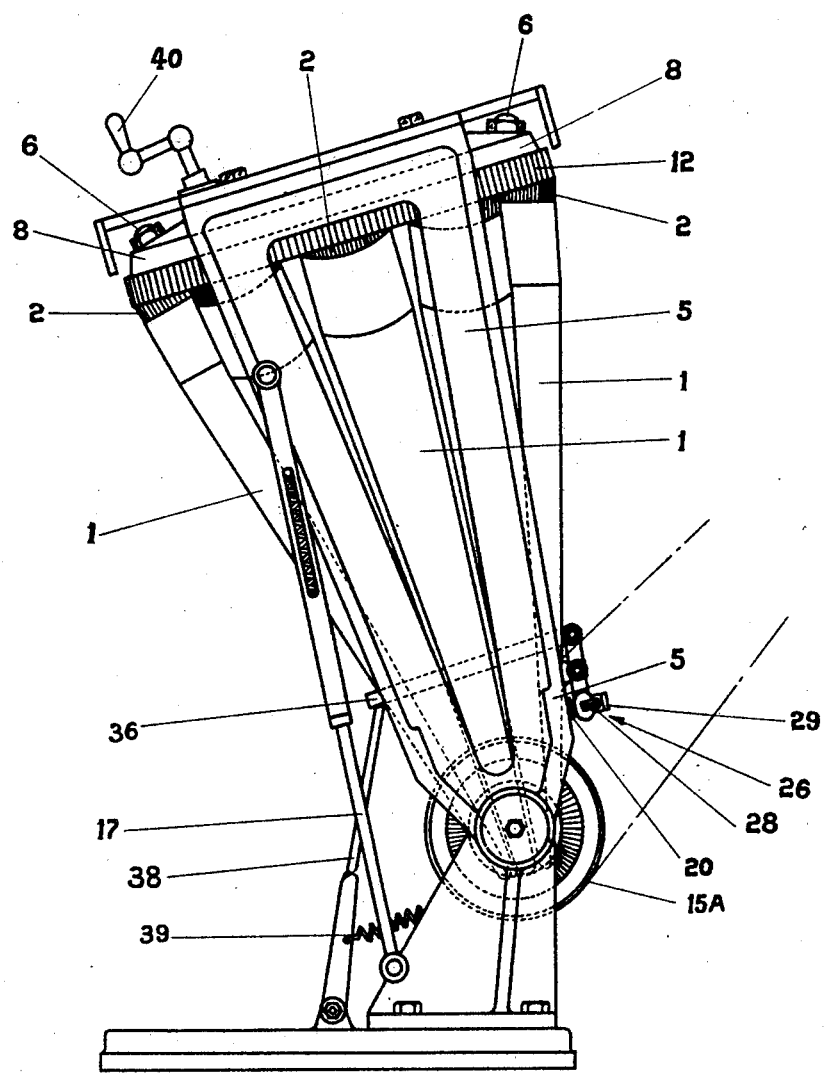
Figure 2 is a side elevation of the machine, portion of the shrouding being omitted.

The container for the batch of confectionery material is formed of a series of tapered rollers 1 which are arranged more or less vertically and whose axes are directed towards each other at the lower end so as to form a somewhat conical vessel. Each roller is provided at its upper end with a pinion 2 which intermeshes with a circular rack 3. This rack is integral with or adjacent to the upper rim 4 of the conical container formed by the rollers and their supports. Each roller is hollow and is rotatably mounted eccentrically upon a stud-axle 6 and ball bearings 7. The upper ends of these stud-axles are carried by a supporting collar 8 which is separated from an extension 9 of the circular rack by means of ball bearings 10 running in one or more circular races 11.

The periphery of the supporting collar is provided with teeth 12 meshing with a pinion 13 on a counter-shaft 14 driven by bevel gearing 15 connected to a main drive pulley 15A on a stationary shaft 16.

The rollers may be eccentrically mounted so that as they rotate they may be timed to alternately reduce and increase the size of the inner space. This eccentric mounting of the rollers produces a kneading action and presses the mass into a rope or similar form. The rollers are not restricted to a circular cross-section; thus, obviously, they might be cam-shaped.

As the rollers have no external bearings near their lower ends or near their working faces, contamination of the confectionery by oil or the like is eliminated.

Means is provided to adjust the inclination of this conical vessel in relation to the vertical, such as by the provision of an adjustable retaining arm 23 (Fig. 4) and supporting arms 5 the latter being pivoted on the stationary shaft 16. The retaining arm is operated by a handle 40. Heating means should be used in the case of confections which harden rapidly on cooling; thus, the rollers may be so timed that they can be heated if desired by a radiator element or other suitable means, the rotation of the whole device and of the separate rollers being such that each part of each roller may be made to pass across the field of the radiator during the operation of the machine.

Means may be provided to vary the eccentricity of the rollers in relation to the stud-axles, in order to adapt the kneading action to different requirements; for example, sleeves, or collars, of various eccentricities could be used between the stud-axles and rollers. As this construction is obvious it is not illustrated.

In the operation of the invention, the batch 18 (shown in Fig. 1 in dotted lines) is dropped into the conical vessel and is automatically worked into a conical shape as the machine rotates around it. At the same time it is kneaded and fed forward in a downward direction in rope-like form 19, normally without rotation of the batch. The rope 19 is shown broken off short for convenience of illustration.

The outward movement of the rollers allows the batch to fall slightly forward between the kneading movements. It is advisable to keep a fair amount of material in the conical vessel; but within reasonable limits the feed into the vessel may be intermittent without affecting the continuity of the rope at the outlet.

Figure 4:
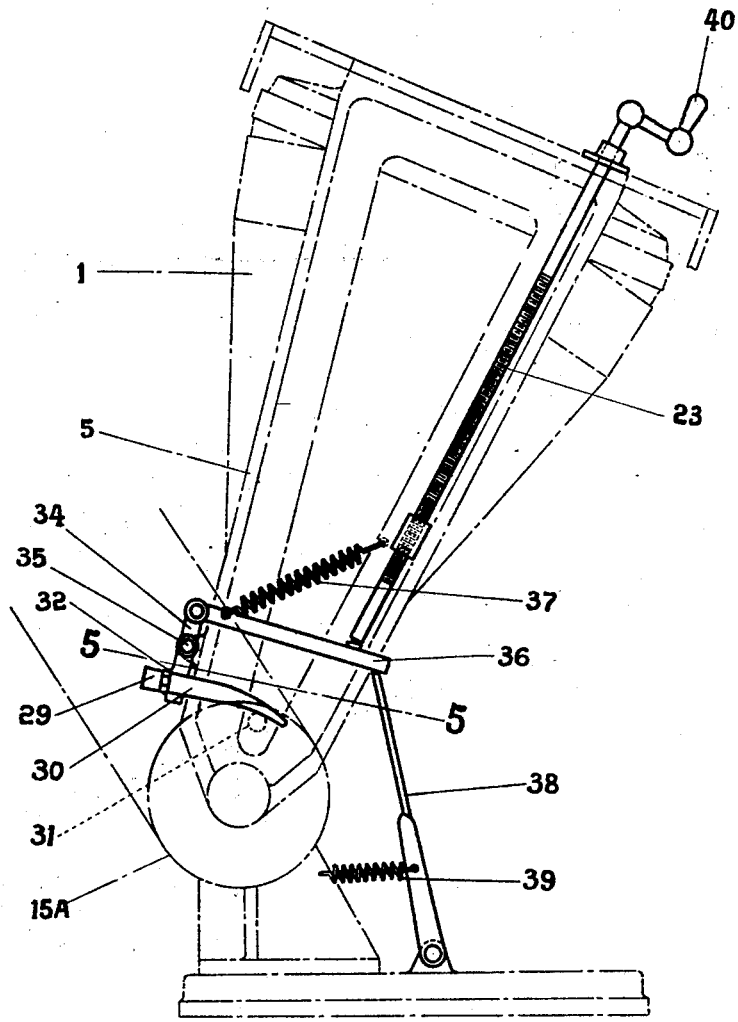
Figure 4 is a view of the releasing means, portions of the remainder of the machine being shown in chain-dotted lines.
Figure 5:
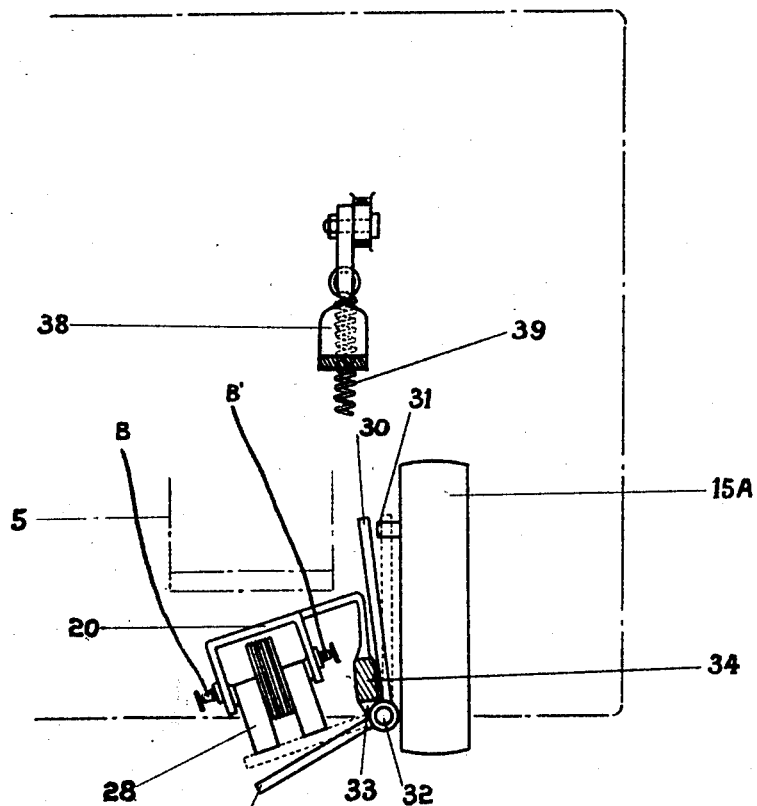
Figure 5 is a schematic plan view taken on the line 5—5 of Figure 4, portions of the machine being omitted for the sake of simplicity.

Normally, this machine is used for feeding the material to other machines such as automatic wrapping or parting machines; but, whatever the type of the feed machine may be, it is desirable to provide means for throwing the feeding machine into the inoperative position if a stoppage or disorder develops in the fed machine. In the case of the former, on a fracture of the wrapping paper 24 occurring, both the feeding and wrapping machines are automatically stopped by the resultant closure of an electric circuit. This stoppage may be effected by providing contacts 21 and 22 (Fig. 8) which normally are held apart and insulated from each other by the web of wrapping paper 24, but which are forced towards each other by means such as springs 25 and thus make metallic contact when a fracture of the paper occurs, so that a circuit is completed from supply lines A and B through a magnetic trip 26, lead B1 and circuit-breaker 27. The current then passes through the coil of the magnetic trip energizing a U-shaped core 28 which is mounted on a projection 20 of an oscillatable arm 34. The energized core then attracts an armature 29 forming one arm of the bell-crank lever, the other arm 30 (Fig. 4) of which is thus moved towards the inner face of the pulley 15A and brought into engagement with an outwardly extending button-like projection 31 (Fig. 4).

The bell-crank lever is connected by a verical pivot 32 to an extension 33 of the oscillatable arm 34 which is horizontally pivoted at 35 and which pivotally carries at its upper end a draw-bar 36. This draw-bar is connected by a retention spring 37 to one of the supporting arms 5. The weight of the container is supported partly by the arms 5 which are pivoted to the stationary shaft 16 and partly by the adjustable retaining arm 23 which maintains it in its relatively vertical or inclined positions. This retaining arm rests upon the draw-bar 36 and this in turn is supported by a pivoted stanchion 38 which is held against the edge of one of the supporting arms 5 by means of a spring 39.

When the arm 30 is brought into engagement with the projection 31 as above described, further rotation of the pulley 15A raises the free end of this arm and causes the pivoted arm 34 to withdraw the draw-bar 36 leaving the container free to swing downwardly by gravitation into the inoperative position. The container is provided with spring buffers 17 which take up the ultimate shock of the fall. The falling of the machine is a useful visual indication that attention is required.

During its downward movement the batch-feeding machine may strike and thus operate the control lever (not shown) of any machine which it is feeding. This may be effected in any known manner, as is obvious. The batch-feeding machine continues to rotate even in this inoperative position as otherwise the batch might droop through between the rollers or adhere to them. In this position however the batch is not fed forward to form a rope.

Figures 6, 7:
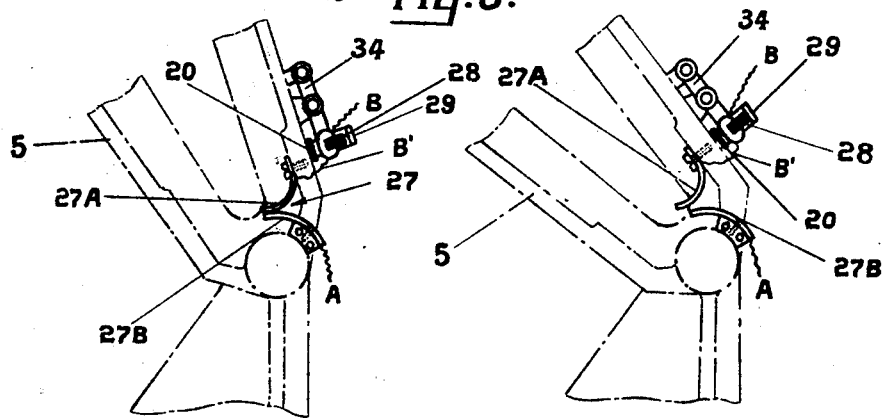
Figure 6 is a schematic view of a circuit-breaker in the closed position.
Figure 7 is a similar view of the circuit breaker in the open position.

The circuit breaker 27 comprises two metallic contacts 27A and 27B which are closed together in the operative position of the container as shown in Fig. 6 and are opened as the container falls towards the inoperative position. The commencement of this movement is shown in Fig. 7. The circuit breaker thus opens the circuit and allows the paper to be rethreaded with safety. When a bunching of the paper occurs a similar set of contacts such as 22 and 41 may be closed to operate the circuit in a similar manner. When the paper has been rethreaded, the wrapping machine may be restarted by the simple process of raising the batch-feeding machine to its operative position, or the starting of the wrapping machine may be used to effect the raising of the batch-feeding machine. The restarting of the mechanism in this way may be effected by any known type of construction and does not in itself form part of this invention. It is obvious that any one of several types of machines may be fed by this feeding machine and their function will determine the nature of the disorder which is to operate the contacts of the tripping circuit but such machines are well known and do not form any part of this invention. By using a plurality of batch-feeding machines arranged in group formation a series of differently coloured ropes may be pressed together by a small auxiliary machine which is common to the whole group of machines and of similar construction to them. This auxiliary machine presses the ropes together into various forms of novel sections such as one resembling the cross section of an orange.

The rollers may be provided with special surfaces, such as knurled or polished surfaces, according to the material to be treated.

The speed of extrusion is governed mainly by the inclination of the feeding machine.

I claim:—

1. The combination, in a confectionery batch-feeding machine, of a rotary container having an inside cross-section progressively decreasing towards its outlet, with kneading means periodically varying said cross-section, said kneading means including portions of the container arranged to rotate on axes other than the axis of the container during rotation of the latter.

2. The combination, in a confectionery batch-feeding machine, of a rotatable support, with eccentrically mounted rollers carried by such support, means for rotating said support, and means for rotating said rollers about their longitudinal axes.

3. The combination, in a confectionery batch-feeding machine, of a frame, with a support, means for rotating said support in relation to said frame, eccentrically mounted tapered rollers carried by said support, means for rotating said rollers as they are carried by said support, a container formed by said rollers, and a restricted outlet between the ends of said rollers.

4. The combination, in a confectionery batch-feeding machine, of a rotatable container, with a series of tapered rollers forming the walls of said container, stud-axles and bearings upon which said rollers are eccentrically mounted, a support for said stud-axles, means for rotating said support, and means for rotating said rollers in relation to said stud-axles when said support is rotated.

5. The combination, in a confectionery batch-feeding machine, of a container, with a pivotal support for said container, rotatably mounted tapered rollers forming the walls of said container, means for supporting said rollers, means for rotating said rollers about their axes of support, and means for adjusting the angle of said container in relation to the vertical.

6. The combination, in a confectionery batch-feeding machine, of a container, with a pivotal support for said container, retaining means holding said container in the operative position, and releasing means allowing said container to fall into its inoperative position when the supply of material from the feeding machine is no longer required.

7. The combination, in a confectionery batch-feeding machine, of a container, with a pivotal support for said container, rotatable eccentrically mounted tapered rollers forming the walls of said container, means for supporting said rollers, means for rotating said rollers about their axes of support, means for retaining said container in its operative position, and means for releasing said container and allowing it to fall into its inoperative position when the supply of material from the feeding machine is no longer required.

8. The combination, in a confectionery batch-feeding machine, of a rotatable container, with tapered rollers forming the walls of said container, means for rotating said container, means for rotating said rollers individually, means for supporting said container in relatively upright position, an electrical circuit, means for closing said circuit, an electro-magnetic tripping device operated by the closure of said circuit, and means operated by said tripping device to release said container and allow it to fall into an inoperative position.

In testimony whereof I affix my signature.

ALFRED CARLYLE DAY.